2,990,324
BIOCIDAL COMPOSITIONS OF ar-HALOGENATED-ar-HYDROXY-INDANE AND PROCESSES THEREWITH

Johannes S. Buck, deceased, late of Albany, by Phillis G. Buck, executrix, Albany, N.Y., assignor, by mesne assignments, to Esta Medical Laboratories, Inc., Dover, Del., a corporation of Delaware
No Drawing. Filed Feb. 26, 1957, Ser. No. 642,346
7 Claims. (Cl. 167—31)

This invention relates to methods for combatting deleterious microorganisms and to certain compositions useful therein. More particularly, this invention relates to the combatting of deleterious microorganisms by the use of compositions containing an antibiotically effective amount of an ar-halogenated-ar-hydroxyindane.

A primary object of the present invention is the provision of novel and highly useful means for combatting deleterious microorganisms present on surface areas of widely varying types, including surfaces which are either living or of inanimate nature, such as mucous membrane, skin, hair, fur, cloth, walls, floors, etc.

The new method of the present invention for combatting deleterious microorganisms comprises bringing into contact with said microorganisms and antibiotically effective amount of an ar-halogenated-ar-hydroxyindane which is an ar-mono-halogenated or ar-dihalogenated 4- or 5-indanol wherein the halogens are middle halogens, i.e., halogens having an atomic weight between 35 and 80, including chlorine and bromine. The method is carried out by topical application in any appropriate fashion, as by spraying, swabbing, immersing or the like treatment of the surface on which there is desired the antibiotic effect, that is to say, a biocidal or biostatic effect, of the ar-halogenated-ar-hydroxyindane. As will be appreciated, the particular mode of application in any given instance is chosen so as best to meet the requirements involved.

For certain purposes, for example in disinfection of non-living objects such as wooden or metallic surfaces, the ar-halogenated-ar-hydroxyindane per se can be applied if desired. Generally speaking, however, it has been found preferable to apply the ar-halogenated-ar-hydroxyindane in admixture with a suitable carrier which can be either inert or antibiotically inactive, or on the other hand can contain other ingredients having antibiotic or other activity. The nature of these carriers is described and illustrated with greater particularity hereinafter.

The ar-monohalogenated and ar-dihalogenated 4- and 5-indanols employed in antibiotically effective amount in the compositions of this invention have the formula

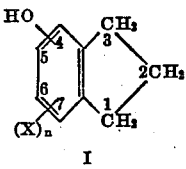

I wherein X is a middle halogen and n is an integer from 1 to 2. These compounds are in general substantially colorless crystalline solids having a phenolic odor. They can be readily obtained by chlorinating or brominating 4-indanol (4-hydroxyindane) or 5-indanol (5-hydroxyindane). The introduction of one equivalent of chlorine or bromine into the aromatic ring leads to the production of all possible isomeric monohalo compounds but the strong ortho-para directing hydroxyl group completely dominates the course of substitution in the aromatic ring. Thus the halogen atom is predominantly introduced in the positions ortho and para to the hydroxyl group. The para substituted compounds having halogen para to the hydroxyl group, which are the major constituents in the mixture of monohalogenated isomers, are separated from the ortho compounds by taking advantage of the well known generalizations that para substituted compounds are less soluble and higher melting than the corresponding ortho compounds. For example, monochlorination of 4-indanol by treatment with one equivalent of sulfuryl chloride produces a mixture of 5-chloro-4-indanol, 6-chloro-4-indanol and 7-chloro-4-indanol, in which the 7-chloro compound predominates. The 7-chloro compound, being less soluble in the common organic solvents, is readily recovered free of the other isomers. Similarly, 5-indanol yields the two ortho isomers, 6-chloro-5-indanol and 4-chloro-5-indanol and a trace of 7-chloro-5-indanol. The 6-chloro isomer predominates, since of the two ortho positions available, viz., the 4 and 6 positions in indanes substituted in the 5-position by an ortho-directing group, the 6 position is favored in the halogenation reaction because of steric considerations. The predominance of the 6-halo-5-indanol in the halogenation reaction is in accord with the known facts regarding analogous substitution reactions of 5-indanols. Thus, diazotization (Mills and Nixon, J. Chem. Soc., 1930, 2510), Fries rearrangement of 5-hydrindene acetate (Baker, J. Chem. Soc., 1937, 476) and carboxylation by the Kolbe method (U.S. Patent 2,078,625, issued April 27, 1937) all lead to the corresponding 6-substituted-5-indanols.

Dichloro and dibromo derivatives are obtained either directly by dichlorination or dibromination of 4-indanol or 5-indanol using two equivalents of halogenating agent or by further chlorination or bromination of the monohalo compounds.

For some purposes it is of course not necessary to separate the various mono and dihalo products and instead the mixtures of reaction products can be employed in the compositions for combatting microorganisms. For other purposes a pure product is desirable and in this case it is preferred to use 7-chloro-4-indanol because it not only has good activity but also is produced at lower cost than the other members of the series.

When using sulfuryl chloride as the chlorinating agent and bromine as the brominating agent, it is preferred to employ a small amount of iodine as a catalyst and to carry out the reaction in an inert organic solvent, such as glacial acetic acid at a temperature below 65 to 70° C.

The carrier with which the antibiotically active compounds (I) above described are admixed can be any suitable solid or liquid diluent which is compatible with the surface to be treated and in which the antibiotic activity of the indanol component (I) is not adversely affected in a substantial degree.

When used in conjunction with a carrier, the percentage of ar-monohalogenated and ar-dihalogenated 4- and 5-indanols (I) in the resulting composition can be varied over a wide range in order that a suitable amount for the particular situation be obtained. Although it has been found that a percentage of less than 0.1 percent of the active ingredient (I) is effective in some cases, it is generally preferred to use not less than 0.1 percent. As will be obvious the percentage can be 10 percent or 50 per cent or even higher proportion up to 100 percent for some purposes, as, for example, when the compositions are to be used for disinfecting floors, walks, locker rooms, swimming pools, etc.

For application of the compositions to living tissue it is naturally desirable and usually necessary that the carrier be pharmaceutically acceptable, by which is meant a carrier which is innocuous, that is substantially non-irritating, free of objectionable odor, and of low toxicity. Pharmaceutically acceptable carriers are of course well known in the art of pharmacy and include, for example, powders such as talc, precipitated calcium carbonate, starches and gums; ointments such as petrolatum, hydrogenated oils, soft fats and waxes, intermediately polymerized ethylene oxide and mono- or di-glycerides of fatty acids; creams such as cetyl alcohol, stearic acid, oleic acid and lanolin; jellies such as starch, tragacanth, agar-agar and gelatin; liquid diluents, as for example, water, liquid petrolatum, alcohol, vegetable oils, polyethylene glycol, acetone, glycerine and syrups; and other dosage forms which are particularly useful for topical application. Carriers of this type are fully described, for example, in Scoville's The Art of Compounding, Seventh Edition (The Blakiston Company, 1943). The percentage of ar-monohalogenated and ar-dihalogenated 4- and 5-indanols in these pharmaceutically acceptable carriers can be varied over a wide range as above described.

The compositions comprising a pharmaceutically acceptable carrier and an antibiotically effective amount of an ar-monohalogenated or ar-dihalogenated 4- or 5-indanol wherein the halogens are middle halogens, are novel and highly useful, and these new compositions constitute one aspect of the instant invention.

The following examples will further illustrate the invention; however, the latter is not to be limited thereby.

EXAMPLE 1

*7-chloro-4-indanol*

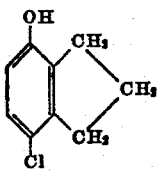

II

To a mixture of 54 g. of 4-indanol, 100 ml. of glacial acetic acid, and a small crystal of iodine, there was slowly added 34 ml. of sulfuryl chloride over a period of about fifteen minutes while maintaining the temperature of the reaction mixture below 55° C. by means of external cooling. The resulting clear yellow-orange solution was stirred for a further period of one hour, and the reaction mixture was then poured onto ice. The mixture was rendered slightly alkaline by addition of 35% aqueous sodium hydroxide solution, and the mixture was then made slightly acidic to litmus by addition of dilute hydrochloric acid. The solid which separated from the solution was collected on a filter, washed with water, and sucked dry. There was thus obtained 65 g. of solid melting at 60–70° C. This product consisted chiefly of a mixture of 7-chloro-4-indanol and 5-chloro-4-indanol and can be used as such for germicidal purposes. Each of the isomers were recovered as pure compounds by taking advantage of the fact that, in a given solvent, the para isomer is less soluble than the corresponding ortho isomer. Thus, after two recrystallizations of the mixture from about eight volumes of petroleum ether each time, there was obtained as a crystalline product 31 g. of 7-chloro-4-indanol in the form of white needles which melted at 91–93° C.

*Analysis.*—Calc'd $C_9H_9ClO$: C, 64.10%; H, 5.38%; Cl, 21.03%. Found: C, 64.59%; H, 5.31%; Cl, 20.90%.

From the recrystallization mother liquors by concentration and cooling, there was isolated a small quantity of 5-chloro-4-indanol having the formula

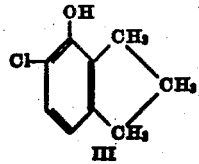

III which melted at 71–72° C.

EXAMPLE 2

*6-chloro-5-indanol*

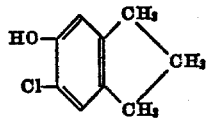

IV

To a mixture of 54 g. of 5-indanol, 100 ml. of glacial acetic acid, and a small crystal of iodine, there was added dropwise with stirring 34 ml. of sulfuryl chloride, while maintaining the mixture below 60° C. The reaction mixture was stirred for a further period of one hour and then poured onto ice. The solution was made barely alkaline by addition of 35% sodium hydroxide solution and then rendered barely acid to litmus by addition of concentrated hydrochloric acid. The black oil which separated from the solution was dissolved in ether, dried over anhydrous calcium sulfate ("Drierite"), and filtered after addition of charcoal. The filtrate was evaporated at reduced pressure to remove the ether, and the dark oily residue thus obtained was distilled at 0.4 mm. The fraction boiling at 83–84° C. weighed 12 g. and had $n_D^{25}$ 1.5763 and consisted chiefly of a mixture of a larger proportion of 6-chloro-5-indanol and a smaller proportion of 4-chloro-5-indanol together with a relatively minor proportion of 7-chloro-5-indanol. When this product was dissolved in petroleum ether and the solution was cooled, white crystals of the desired 6-chloro-5-indanol which melted at 37–40° C. separated from solution.

*Analysis.*—Calc'd $C_9H_9ClO$: C, 64.10%; H, 5.38%; Cl, 21.03%. Found: C, 64.08%; H, 5.53%; Cl, 20.53%.

EXAMPLE 3

*7-bromo-4-indanol*

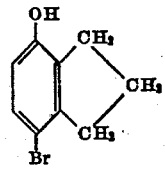

V

A solution of 40.3 g. of 4-indanol in 100 ml. of glacial acetic acid was placed in a three-necked round bottom flask fitted with a dropping funnel with drying tube, thermometer and stirrer. A crystal of iodine was added followed by the dropwise addition of 48 g. of bromine in 30 ml. of glacial acetic acid. During the addition the temperature rose to 50° C. The solution was stirred for five minutes after the addition was completed and then made just basic with sodium hydroxide. Acidification of the solution with dilute hydrochloric acid caused the separation of a brown oil which solidified on standing. The solid was collected by suction filtration, extracted with ether and the ethereal extract dried over anhydrous calcium sulfate. The ether was removed by distillation and the residual oil triturated with n-pentane. The crystals which precipitated were collected by suction filtration and recrystallized from n-pentane. There was thus obtained 14.8 g. of 7-bromo-4-indanol, M.P. 107–108.2° C. (corr.).

*Analysis.*—Calc'd $C_9H_9BrO$: Carbon, 50.6; hydrogen, 4.26; bromine, 37.4. Found: Carbon, 50.6; hydrogen, 4.39; bromine, 37.59.

The melting point given above agrees with that reported in the literature for pure 7-bromo-4-indanol as 108–108.8° C. thus establishing the identity of the two substances.

5,7-dibromo-4-indanol can be prepared by the interaction of 7-bromo-4-indanol with one equivalent of bromine or by the interaction of 4-indanol with two equivalents of bromine.

EXAMPLE 4

5,7-dichloro-4-indanol

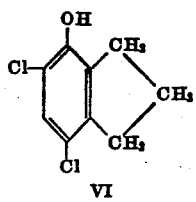

To a mixture of 40.5 g. of 4-indanol, 100 ml. of glacial acetic acid, and a small crystal of iodine, there was added dropwise with stirring 52 ml. of sulfuryl chloride, while maintaining the temperature of the mixture below 55° C. The reaction mixture was then stirred for an additional period of one hour, and then the yellow solution was poured onto ice. The reaction mixture was rendered barely alkaline with 35% sodium hydroxide solution and then rendered barely acidic by adding acetic acid. The solid which separated from the mixture was collected on a filter, washed with water and sucked dry. There was thus obtained 62 g. of white solid. This product consisted chiefly of 5,7-dichloro-4-indanol together with a minor proportion of 5-chloro-4-indanol and 7-chloro-4 indanol. This mixture can be used as such as an antibacterial agent. This product was dissolved in 300 ml. of petroleum ether, treated with charcoal, and filtered. The pale yellow filtrate was chilled in ice and the solid which separated from solution was collected on a filter and washed with cold petroleum ether. There was thus obtained 37.3 g. of 5,7-dichloro-4-indanol in the form of a white solid which melted at 58–60° C. After recrystallization from petroleum ether, this product melted at 54–57° C.

*Analysis.*—Calc'd $C_9H_8Cl_2O$: Cl, 34.92%; neutral equivalent, 203.1. Found: Cl, 34.60%; neutral equivalent, 201.8.

The 5,7-dichloro-4-indanol described above is also obtained by interaction of either 7-chloro-4-indanol or 5 chloro-4-indanol with one equivalent of sulfuryl chloride.

The assigned structure of the isomers described above was confirmed by the preparation of certain of the isomers by an independent process. Thus, 7-chloro-4-indanol was prepared from 4-chlorophenol, a compound whose structure is established without question, using the following sequence of reactions:

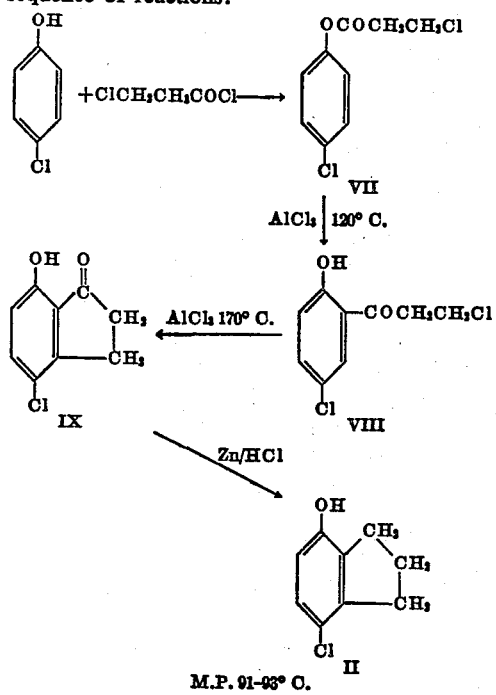

The above product M.P. 91–93° C. was identical, as shown by the melting point and mixed melting point, with the 7-chloro-4-indanol obtained in Example 1.

The assignment of the structure of the second monochloroindanol of Example 1 as 5-chloro-4-indanol must perforce be correct since further chlorination leads to the same dichloro indanol (Example 4), as shown by melting point and mixed melting point, as that produced by further chlorination of 7-chloro-4-indanol. This sequence of reactions is summarized as follows:

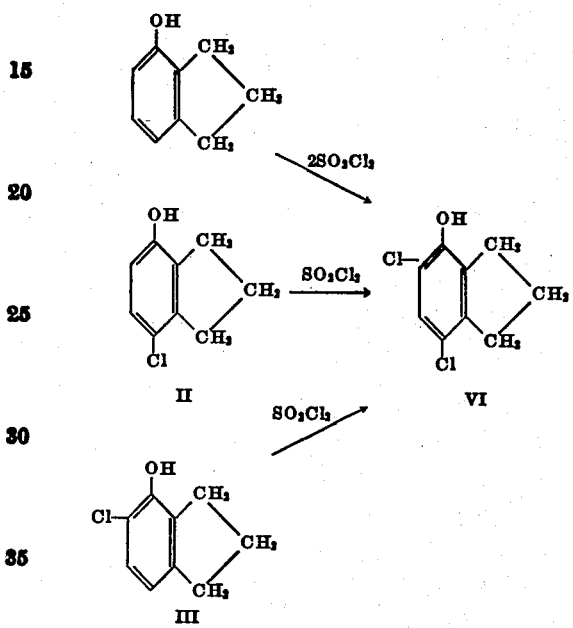

The efficacy of the halogenated indanols as antibacterial, antifungal, antiviral, sporocidal and spermatocidal agents is shown hereinafter. Thus the compounds have antibacterial activity against such genera as Streptococcus, Staphylococcus, Escherichia, Proteus, Pseudomonas, Eberthella, Salmonella, Shigella, Vibrio, Brucella, Mycobacterium, Clostridium and Desulfovibrio; antifungal activity against such genera as Trichophyton, Aspergillus and Monilia; antiviral activity against such viruses as meningopneumonitis, canine distemper, Newcastle disease, Semliki Forest and vaccinia, and sporocidal activity against Bacillus and Clostridium.

The germicidal efficiency of 7-chloro-4-indanol was determined using F.D.A. broth and the following results were obtained.

| Organism | Dilution of 7-chloro-4-indanol killing in 10 but not in 5 minutes |
|---|---|
| *S. aureus* | 1:1542 |
| *E. typhi* | 1:4500 |
| *Es. coli* 4157 G | 1:3500 |
| *Es. coli* No. 198 | 1:3500 |
| *S. enteriditis* 588 | 1:4000 |
| *Ps. aeruginosa* 211 | 1:1500 |
| *Ps. aeruginosa* NO | 1:1500 |

The germicidal efficiency of 5-chloro-4-indanol against *E. typhi* was found to be 1:2500 and that of a mixture of 7-chloro-4-indanol and 5-chloro-4-indanol 1:3500.

The antibacterial activity of the haloindanols of the invention was determined using conventional serial dilution techniques. The values obtained for two of the compounds are given in Table I.

TABLE I

| Organism | Minimum Effective Dilution, mg./1 cc. | | | |
|---|---|---|---|---|
| | Bacteriostatic | | Bactericidal | |
| | 7-chloro-4-indanol | 7-bromo-4-indanol | 7-chloro-4-indanol | 7-bromo-4-indanol |
| Strep. pyogenes C-203 | 11,000 | | 5,000 | |
| Strep. bisidens 9811 | 11,000 | | 10,000 | |
| Strep. faecalis 10C1 | 12,500 | 11,000 | 10,000 | 10,000 |
| Staph. aureus 209 | 16,700 | 5,000 | 10,000 | 5,000 |
| D. pneumoniae II | 33,000 | | 20,000 | |
| D. pneumoniae I | 33,000 | | 20,000 | |
| Es. coli No. 196 | 14,300 | 5,000 | 11,000 | 5,000 |
| Es. coli 4157G | 16,700 | | 12,500 | |
| Pr. mirabilis 9021 | | 10,000 | | 10,000 |
| Pr. vulgaris 9020 | 10,000 | 11,000 | 10,000 | 11,000 |
| Ps. aeruginosa 211 | 5,000 | 2,000 | 2,000 | 2,000 |
| Ps. aeruginosa New Orleans | 2,000 | 2,000 | 2,000 | 2,000 |
| Eberth. typhi Hopkins | 20,000 | | 10,000 | |
| Sal. paratyphi 9150 | 14,300 | | 12,500 | |
| Sal. schottmuelleri | 14,300 | | 12,500 | |
| Sal. enteritidis 588 | 16,700 | | 12,500 | |
| Sh. dysenteriae Harvard | 20,000 | | 14,300 | |
| Sh. paradysenteriae 9199 | 16,700 | | 14,300 | |
| Sh. sonnei | 14,300 | | 10,000 | |
| V. cholerae No. 23 | 33,000 | | 25,000 | |
| Br. abortus 11192 | 33,000 | 33,000 | 14,300 | 14,300 |
| Br. melitensis L-1 | 20,000 | | 10,000 | |
| Br. suis 1744 | 16,700 | | 14,300 | |
| Past. Boviseptica | 20,000 | | 14,300 | |
| Myco. smegmatis | | 16,700 | | 14,300 |
| Myco. Tuberculosis H37RV | 50,000 | | 25,000 | |
| Cl. welchii | 16,700 | | 10,000 | |
| D. desulfuricans 7757 | 33,000 | 33,000 | 14,300 | 12,500 |
| Aerobacter aerogenes | | 5,000 | | 5,000 |
| Kleb. pneumoniae 48 | | 11,000 | | 5,000 |

The in vitro antifungal activity of representative compounds as measured by conventional serial dilution techniques is given in Table II.

TABLE II

*Maximum effective dilution*

FUNGISTATIC

| Organism | 7-Chloro-4-indanol | 5-Chloro-4-indanol | 7-Bromo-4-indanol | 5,7-Dichloro-4-indanol |
|---|---|---|---|---|
| Trichophyton interdigitale | 1:40,000 | 1:20,000 | 1:80,000 | 1:80,000 |
| Trichophyton mentagrophytes | 1:80,000 | 1:20,000 | 1:80,000 | 1:200,000 |
| Aspergillus niger | 1:40,000 | 1:13,000 | 1:40,000 | 1:40,000 |
| Trichophyton gypseum | 1:40,000 | 1:13,000 | 1:40,000 | 1:80,000 |
| Monilia albicans | 1:33,000 | 1:10,000 | 1:33,000 | 1:40,000 |

FUNGICIDAL

| Organism | 7-Chloro-4-indanol | 5-Chloro-4-indanol | 7-Bromo-4-indanol | 5,7-Dichloro-4-indanol |
|---|---|---|---|---|
| Trichophyton interdigitale | 1:40,000 | 1:10,000 | 1:40,000 | 1:40,000 |
| Trichophyton mentagrophytes | 1:40,000 | 1:10,000 | 1:40,000 | 1:80,000 |
| Aspergillus niger | 1:33,000 | 1:4,000 | 1:2,000 | 1:33,000 |
| Trichophyton gypseum | 1:33,000 | 1:10,000 | 1:33,000 | 1:40,000 |
| Monilia albicans | 1:33,000 | 1:4,000 | 1:20,000 | 1:40,000 |

The activity of the compounds of the compositions of the invention as virus inactivating agents was determined by treating live virus in vitro with a solution of the compound in aqueous acid or alcoholic solution, then injecting the solution into a susceptible animal species such as the mouse or the chick embryo, and observing whether disease developed or death occurred. The concentration of virus used in the tests is selected in such a way that when the virus suspension is diluted ten to one hundredfold an observable reaction is produced in the viability test, e.g., egg or animal. The following examples show the effectiveness of the compounds as inactivators of representative viruses at dilutions of 1:1,000 to 1:20,000.

EXAMPLE 5

A 1:10,000 dilution of 7-chloro-4-indanol in dilute isopropyl alcohol inactivated Newcastle disease virus, McCabe strain as shown by the survival of 9/10 chick embryos whereas all embryos injected with the virus alone died.

EXAMPLE 6

A 1:10,000 dilution of a mixture of 7-chloro-4-indanol and 5-chloro-4-indanol, as obtained in Example 1, in dilute isopropyl alcohol inactivated Newcastle disease virus, McCabe strain, as shown by the survival of 9/10 chick embryos or 10/10 Swiss mice, whereas all embryos and mice injected with the virus alone died.

EXAMPLE 7

A 1:1,000 dilution of 7-chloro-4-indanol in 10% horse serum inactivated influenza A, strain PR 8, as shown by the absence of viral propagation in embryonic eggs, as evidenced by hemagglutination titres, of all embryos whereas 8/8 embryos injected with virus alone showed viral propagation.

EXAMPLE 8

A 1:2,500 dilution of 7-chloro-4-indanol in distilled water inactivated vaccinia virus as evidenced by the absence of cutaneous lesions in a rabbit whereas 12/12 rabbits injected with the virus alone showed cutaneous lesions.

EXAMPLE 9

A 1:1,000 dilution of 7-bromo-4-indanol in dilute isopropyl alcohol inactivated influenza A, strain PR 8 virus, as shown by the absence of viral propagation in embryonic eggs, as evidenced by hemagglutination titres, of all embryos, while all embryos injected with the virus alone showed viral propagation.

EXAMPLE 10

Feline pneumonitis virus was inactivated by a 1:2500 dilution of 7-bromo-4-indanol in dilute isopropyl alcohol as shown by the survival of 10/10 embryos while all embryos injected with the virus alone died.

The same results were obtained when 7-bromo-4-indanol was dissolved in 10% horse serum, saline solution or bovine albumin.

EXAMPLE 11

Replacement of the 7-bromo-4-indanol with 7-chloro-4-indanol in Example 10 gave the same result in water, saline, 10% horse serum or brovine albumin.

EXAMPLE 12

Canine distemper virus, Onderstepoort strain, was inactivated by a 1:5,000 dilution of 7-chloro-4-indanol in water, 0.5% bovine albumin or 10% horse serum as shown by the absence of pox-like lesions in the chorioallantoic membrane of embryonated eggs while all embryonated eggs injected with the virus alone showed such lesions.

EXAMPLE 13

Fowl laryngotracheitis virus was inactivated by a 1:2500 dilution of 7-chloro-4-indanol in water or 10% horse serum as shown by the absence of pox-like lesions on the chorioallantoic membrane of embryonated eggs while all control eggs showed such lesions.

EXAMPLE 14

Vaccinia virus was inactivated by a 1:2500 dilution of 5,7-dichloro-4-indanol in water as shown by the absence of cutaneous lesions in rabbits while such lesions were present in all control rabbits.

EXAMPLE 15

Rabies virus, Flury strain was inactivated by a 1:2500 dilution of 7-chloro-4-indanol in 10% serum as shown by the survival of all mice injected while all control mice died.

EXAMPLE 16

The MM strain encephalomyocarditis was inactivated by a 1:10,000 dilution of 7-bromo-4-indanol in 15% isopropyl alcohol as shown by the survival of all mice injected while injection of the virus alone caused the death of all control mice.

EXAMPLE 17

Semliki Forest encephalitis virus was inactivated by a 1:1000 dilution of 7-chloro-4-indanol in water, 10% isopropyl alcohol and 10% horse serum as shown by the survival of all mice injected while death occurred in all mice injected with the virus alone.

EXAMPLE 18

Meningo-pneumonitis virus was inactivated by a 1:2500 dilution of 7-chloro-4-indanol in water or 10% horse serum as shown by the survival of, and absence of lung lesions in, all mice while death and lung lesions occurred in all control mice.

Similar results were obtained when a surface active agent such as benzalkonium chloride (alkyldimethylbenzylammonium chloride) was added. The surface active agent alone did not inactivate the virus as shown by the death of all mice injected.

EXAMPLE 19

The MM strain of encephalomyocarditis was inactivated by a 1:20,000 dilution of 7-chloro-4-indanol in dilute isopropyl alcohol or water as shown by the survival of all mice while death occurred in all control mice.

A further advantage of the active ingredients incorporated in the compositions of the invention is their low degree of toxicity and irritation. Thus the $LD_{50}$'s or the milligrams per kilogram of body weight necessary to kill 50% of the animals tested, for 7-chloro-4-indanol and 7-bromo-4-indanol, as determined by intravenous injection of mice, are 49±3 mg./kg. and 53±4 mg./kg. respectively. Additional studies showed that 7-chloro-4-indanol has an oral $LD_{50}$ of 1000±46 mg./kg. and an interparenteral $LD_{50}$ of 96±22 mg./kg. When suspended in gum tragacanth the $LD_{50}$ was 2220±138 mg./kg. for 7-chloro-4-indanol.

The 7-chloro-4-indanol was completely tolerated when administered orally to rats as a suspension in gum tragacanth, 18 times in 23 days, at a daily dose of 200 mg./kg. There were no deaths attributed to the compound and there were no significant changes in the blood picture or tissues.

Irritation tests were carried out using 7-chloro-4-indanol and 7-bromo-4-indanol as powders or as 2% solutions in 46% polyethylene glycol 400 in water. When the preparations were maintained in contact with the intact or abraded skin of albino rabbits, there was no evidence of irritation. The above solutions, when applied to the penile mucosa of a rabbit, showed no irritation.

The following formulations, as well as those already given above, are intended to be illustrative only and they may be varied or modified to a considerable extent without departing from the spirit of the invention. It is not intended to limit the invention to the specific embodiments herein set forth.

EXAMPLE 20

Greaseless ointment base (cream)

| | Gm. |
|---|---|
| Active ingredient | 5.0 |
| Alkylpolyether alcohol | 12.5 |
| Cetyl alcohol | 40.0 |
| Stearyl alcohol | 10.0 |
| Water, q.s. | 1000.0 |

EXAMPLE 21

Formulation with soap

| | Gm. |
|---|---|
| Active ingredient | 10.0 |
| Cocoanut oil soap | 20.0 |
| Isopropyl alcohol | 15.0 |
| Water | 55.0 |
| | 100.0 |

EXAMPLE 22

Germicidal detergent

| | Gm. |
|---|---|
| Active ingredient | 2.0 |
| Alkylaryl sodium sulfonate | 30.0 |
| Tetrasodium pyrophosphate | 30.0 |
| Sodium carbonate decahydrate | 40.0 |
| | 102.0 |

EXAMPLE 23

General germicide

| | Gm. |
|---|---|
| Active ingredient | 50.0 |
| Ricinoleic acid | 50.0 |
| Ethyl alcohol, 95% | 100.0 |
| Terpineol | 100.0 |
| Water, q.s. | 1000.0 |

EXAMPLE 24

Spermatocidal jelly

| | Gm. |
|---|---|
| Perfume | 0.06 |
| 7-chloro-4-indanol | 1.00 |
| Lauryl alcohol sulfate (Duponol PC) | 2.00 |
| Ricinoleic acid | 10.00 |
| Sodium chloride | 100.00 |
| Glycerin | 100.00 |
| Tragacanth | 25.00 |
| Methyl p-hydroxybenzoate | 1.00 |
| Calcium hydroxide | 0.268 |
| Lactic acid, 85.6% | 0.27 |
| Water, de-ionized, filtered, q.s. | 1000.0 |

(1) Dissolve the methyl p-hydroxybenzoate in 615 gms. of water. Disperse calcium hydroxide in this solution.

(2) Mix tragacanth with glycerin.

(3) Add 1 to 2, mix one hour.

(4) Dissolve 7-chloro-4-indanol in ricinoleic acid at 65° C. Cool and dissolve perfume in this solution.

(5) Disperse lauryl alcohol in (4), mix.

(6) Add 100 gms. of water to (5) by geometric dilution, mix thoroughly with each addition of water.

(7) Add (6) to (3) and mix.

(8) Add sodium chloride, lactic acid and enough water to bring to final weight. Mix until sodium chloride dissolves and jelly is homogeneous.

(9) Strain jelly through a 100 mesh screen.

This jelly contains a spermatocidally effective amount of an ar-halogenated-ar-hydroxyindane and is useful for vaginal application.

EXAMPLE 25

Tincture

| | | |
|---|---|---|
| Active ingredient | gm. | 1.0 |
| Alcohol 95% | ml. | 500.0 |
| Acetone | ml. | 200.0 |
| Water, q.s. | liters | 1.0 |

In each of the foregoing Examples 20–25, inclusive, the term "Active Ingredient" designates an ar-halogenated-ar-hydroxyindane (I).

The instant application is a continuation-in-part of the co-pending Johannes S. Buck application Serial No. 445,174, filed July 22, 1954, now abandoned.

What is claimed and desired to protect by Letters Patent is:

1. The process for combatting deleterious microorganisms which comprises bringing into contact with said microorganisms at least 0.1% by weight of an ar-halogenated-ar-hydroxyindane having the formula

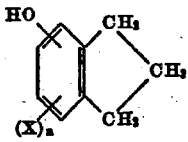

wherein X is a middle halogen having an atomic weight between 35 and 80 and $n$ is an integer from 1 to 2.

2. The process for combatting deleterious microorganisms which comprises bringing into contact with said microorganisms a composition comprising a carrier and at least 0.1% by weight of an ar-halogenated-ar-hydroxyindane having the formula

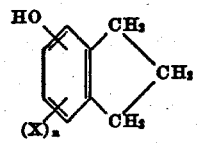

wherein X is a middle halogen having an atomic weight between 35 and 80 and $n$ is an integer from 1 to 2.

3. The process for combatting deleterious microorganisms which comprises bringing into contact with said microorganisms a composition comprising a pharmaceutically acceptable carrier and at least 0.1% by weight of an ar-halogenated-ar-hydroxyindane having the formula

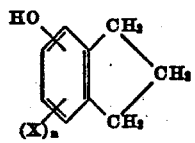

wherein X is a middle halogen having an atomic weight between 35 and 80 and $n$ is an integer from 1 to 2.

4. A composition for combatting deleterious microorganisms comprising at least 0.1% by weight of 7-chloro-4-indanol, and cetyl alcohol as a creamy pharmaceutically acceptable carrier.

5. A composition for combatting deleterious microorganisms comprising at least 0.1% by weight of 7-chloro-4-indanol, and a lower-alkanol as a liquid pharmaceutically acceptable carrier.

6. A spermatocidal composition comprising at least 0.1% by weight of an ar-halogenated-ar-hydroxyindane having the formula

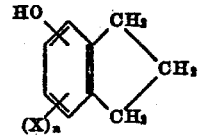

wherein X is a middle halogen having an atomic weight between 35 and 80 and $n$ is an integer from 1 to 2, a water dispersible thickening agent having adhesive action in the composition, a plasticizing agent and an aqueous pharmaceutically acceptable carrier.

7. A spermatocidal composition in accordance with claim 6 in which the ar-halogenated-ar-hydroxyindane is 7-chloro-4-indanol, the thickening agent is tragacanth and the plasticizing agent is glycerin.

References Cited in the file of this patent

UNITED STATES PATENTS 2,410,497   Hentrich et al. _____ Nov. 5, 1946

OTHER REFERENCES

New and Non-Official Remedies, 1951, pp. XXVII–XXXII.
Hurst: J. of Phar. and Pharmacol., 9:5, May 1957, pp. 273–292.
Barnes et al.: J. Am. Chem. Soc., vol. 71 (1949).
Mills et al.: J. Chem. Soc., London, 1930, pp. 2523–4.
Gamble: J.A.M.A., July 11, 1953, vol. 152, No. 11, pp. 1037–1041.